June 2, 1953  E. P. KENNEDY  2,640,519
NUT-CRACKING MACHINE
Filed Feb. 6, 1950

INVENTOR
EUGENE P. KENNEDY
BY Herman L. Gordon
ATTORNEY

Patented June 2, 1953

2,640,519

UNITED STATES PATENT OFFICE 2,640,519

NUT-CRACKING MACHINE

Eugene P. Kennedy, Tulsa, Okla.

Application February 6, 1950, Serial No. 142,573

5 Claims. (Cl. 146—12)

This invention relates to nut cracking machines, and more particularly to nut cracking machines of the power-driven type.

A main object of the invention is to provide a novel and improved nut cracking machine which is very simple in construction, which may be employed to crack nuts which vary widely in size and shape, and which cracks the shells of the nuts without injuring the nut meats.

A further object of the invention is to provide an improved nut cracking machine which provides cumulative relatively short strokes of cracking pressure on the nuts, to crack the nut shells without damaging the nut meats, the machine being arranged to hold the nuts firmly for application of the repeated short compression strokes, regardless of variations in the size and shape of the nuts.

A still further object of the invention is to provide an improved nut cracking machine which is rugged in construction, involves only a few parts, and which is inexpensive to manufacture.

A still further object of the invention is to provide an improved power-driven nut cracking machine wherein the operator may readily control the overall cracking pressure applied to the nuts and wherein the cracking force is applied to the nuts in short, successive pulses, whereby the nut shells are cracked in a manner enabling said shells to be removed without damage to the nut meats.

Further objects and advantages of the invention will become apparent from the following description and claims, and from the accompanying drawings, wherein:

Figure 1:
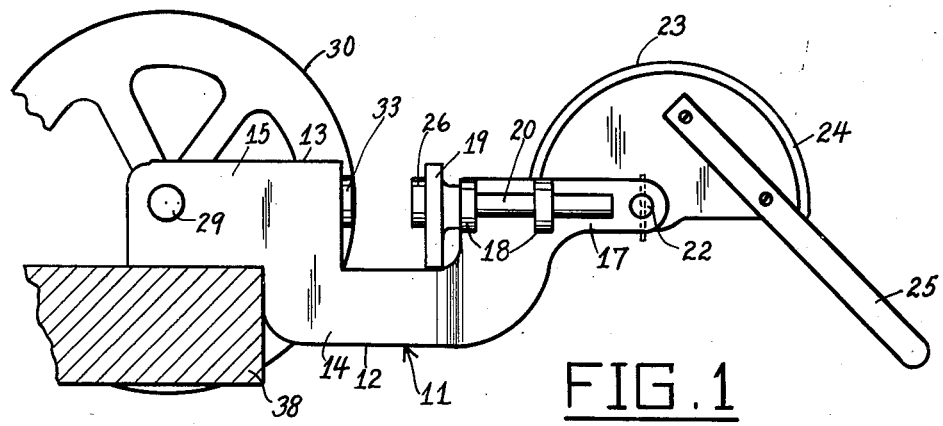
Figure 1 is a side elevational view of an improved nut cracking machine constructed in accordance with the present invention.
Figure 3:
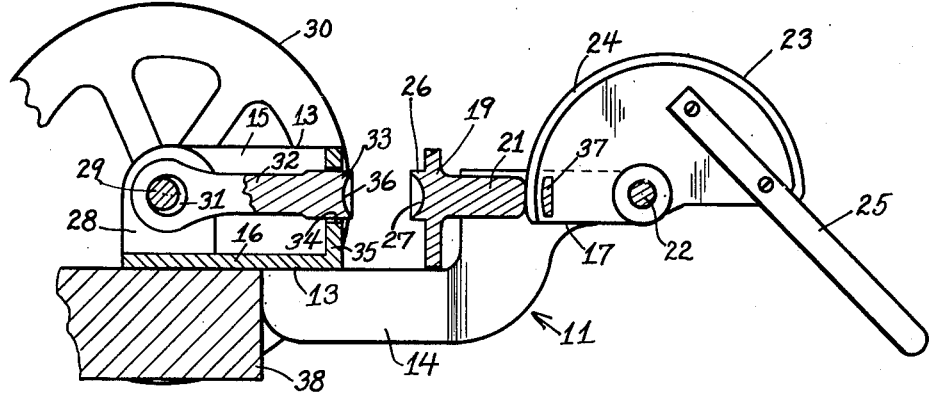
Figure 3 is a longitudinal vertical cross-sectional view taken on line 3—3 of Figure 2.

Referring to the drawings, the machine is designated generally at 11. Said machine comprises a frame 12 having a box-like rear portion 13 provided with forwardly extending transversely spaced longitudinal arms 14, 14. As shown in Figures 1 and 3, said arms 14 are integral with the side walls 15, 15 of the box-like portion 13, and the top edges of said arms are substantially in the same horizontal plane as the bottom surface of the bottom wall 16 of portion 13. The forward ends of the arms 14, 14 are upwardly and inwardly offset, as shown at 17, 17, and each of the inwardly offset arm portions 17, is formed with a pair of longitudinally spaced outwardly directed vertical apertured ears 18, 18.

Designated at 19 is a transversely extending anvil member whose bottom edge is slidably supported on the top edges of arms 14, 14. Said anvil member is provided with forwardly extending parallel guide rods 20, 20 which extend slidably through the respective pairs of apertured ears 18, 18, supporting the anvil member 19 in an upright position. Said anvil member is further provided with a forwardly extending longitudinal stem 21 which is slidably received between the arm portions 17, 17.

Figure 2:
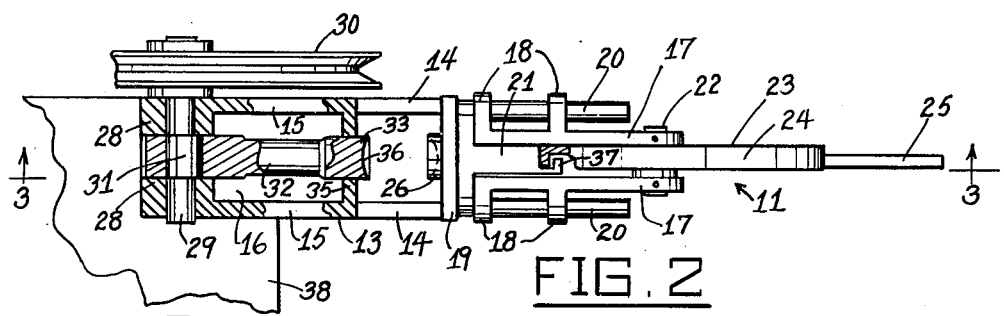
Figure 2 is a top plan view, partly in horizontal cross-section, of the nut cracking machine of Figure 1.

Secured transversely in the forward ends of the arm portions 17, 17 is a shaft 22. Rotatably mounted on said shaft between the arm portions 17, 17 is an eccentric cam 23 having a peripheral flange 24. The end of stem 21 is formed with a hook element 37 engaging around flange 24, as shown in Figure 2. Cam 23 has secured thereto a downwardly and forwardly inclined handle 25, by means of which the cam may be manually rotated to regulate the position of the anvil member 19.

At its rear end, anvil member 19 is provided with a boss 26 formed with a cup-like recess 27. Boss 26 is in longitudinal alignment with the stem 21.

The rear portions of the side walls 15, 15 of the box-like element 13 are formed with inner pads 28, 28, and journalled transversely in said rear portions and rotatively supported in said pads is a shaft 29. Secured to one end of shaft 29 is a peripherally grooved, relatively large pulley 30, which may be coupled by a suitable belt, not shown, to a smaller pulley carried on the shaft of an electric motor. The intermediate portion of shaft 29, between the pads 28, 28, is formed with an eccentric portion 31. Journalled on eccentric portion 31 is the rear end of a plunger rod 32. The forward end of plunger rod 32 is formed with a head 33 which extends loosely through an opening 34 formed in the forward wall 35 of the box-like element 13. The plunger rod 32 is substantially longitudinally aligned with the anvil stem 21. The end of the plunger head 33 is formed with a cup-like recess 36.

It will be apparent that rotation of pulley 30 will cause plunger rod 32 to reciprocate longitudinally. The eccentric portion 31 is greater in diameter than the shaft 29 by a relatively small amount, so that the stroke of plunger rod 32 is relatively short. The head 33 projects a relatively short distance outside the wall 35 and is spaced from the anvil boss 26 by a distance suitable for receiving nuts therebetween.

In operation, a nut is held between the head 33 and the anvil boss 26 and the handle 25 is elevated to move the anvil toward the nut, so that the nut is gripped between the cup-like recesses 36, 27. The operator then releases the nut and further elevates the handle 25 slightly, whereby the pressure on the nut is increased. The plunger rod 32 meanwhile is reciprocating and applies repeated short pressure strokes to the nut. As the force applied to anvil 19 by cam 23 is gradually increased, the repeated short-stroke impacts of the plunger rod 32 cause the nut to be cracked, without crushing the nut meat. When the nut shell is cracked, the operator retracts the anvil by rotating handle 25 downwardly, whereby flange 24 exerts retractile force on the hook portion 37, releasing the cracked nut and allowing the nut to fall between and through the arms 14, 14 of the frame into a suitable receptacle.

The box-like rear portion 13 of the frame may be fastened in any suitable manner to the corner of a bench or table 38, allowing the remainder of the machine to overhang, as shown.

It will be noted that the nuts are cracked by the combined pressures provided by the cam 23 and the reciprocating plunger rod 32. Continuous hand pressure is applied by handle 25, which tightens the anvil boss 26 against the nut, allowing the cam to rotate a little on each back stroke of the plunger rod. The short forward stroke of the plunger rod thus occurs with the nut tightly wedged between the recesses 36 and 27.

The machine above described is of particular value in shelling nuts such as pecans, black walnuts, and the like.

For example, in cracking the shells of black walnuts, which have a natural crack or seam dividing the shell in half, the concave recesses 36, 27 hold the halves of the shell together, preventing the nut from splitting at said natural crack or seam, and instead, cause the shell to crack in many places, whereby the shell may be removed without injuring the nut meat.

The machine of the present invention reduces risk of injury to the operator to a minimum, due to the very short stroke of the cracking plunger 32, which may be of the order of one sixteenth of an inch. In the machines of the prior art, the cracking stroke is frequently at least one half inch long, which presents a substantial hazard to operators.

While a specific embodiment of a nut cracking machine has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A nut cracking machine comprising a frame, a shaft journalled in said frame, an eccentric carried by said shaft, a plunger journalled on said eccentric, means on the frame supporting said plunger for reciprocating and oscillating movement, an anvil, means on said frame supporting said anvil for sliding movement substantially in the axial direction of said plunger, the free end of the plunger extending toward said anvil, and a manually operated cam rotatably mounted in said frame for rotation in the plane of said plunger and around an axis normal to that of the anvil and engaging the anvil at its end opposite said plunger.

2. A nut cracking machine comprising a frame, a shaft journalled in said frame, an eccentric carried by said shaft, a plunger journalled on said eccentric, means on the frame supporting said plunger for reciprocating and oscillating movement, the end of the plunger being formed with a recess, an anvil facing said recess, said anvil being formed with a recess facing the recess in the plunger, means on said frame supporting said anvil for sliding movement substantially in axial alignment with said plunger, and an anvil-actuating cam rotatably mounted on said frame for rotation in the plane of said plunger and around an axis normal to that of the anvil and engaging said anvil at its end opposite said plunger.

3. A nut cracking machine comprising a frame including a pair of parallel, vertical, spaced arms defining a discharge passage therebetween for cracked nuts, a substantially horizontal reciprocating plunger mounted in said frame for reciprocation substantially parallel to, above, and in a vertical plane between the vertical planes of said arms, means to reciprocate said plunger, an anvil slidably mounted on said frame for movement substantially in the axial direction of said plunger, said anvil having a depending transverse flange slidably supported on the top edges of said arms to guide said anvil, a stem carried by said anvil and extending between said arms on the side of the anvil opposite said plunger, the free end of said plunger extending toward said anvil, and a cam journalled between said arms and engaging the end of said stem.

4. A nut cracking machine comprising a frame including a pair of parallel, vertical, spaced arms defining a discharge passage therebetween for cracked nuts, a substantially horizontal reciprocating plunger mounted in said frame for reciprocation substantially parallel to, above, and in a vertical plane between the vertical planes of said arms, means to reciprocate said plunger, an anvil slidably mounted on said frame for movement substantially in the axial direction of said plunger, a stem carried by said anvil and extending between the arms on the side of the anvil opposite said plunger, the free end of said plunger extending toward said anvil, a depending transverse flange on said anvil slidably engaging the top edges of said arms to guide said anvil, a cam journalled between said arms adjacent said stem, a flange on said cam, and a hook element on said stem engaging around said last-named flange.

5. A nut cracking machine comprising a frame including a pair of parallel, vertical, spaced arms defining a discharge passage therebetween for cracked nuts, a substantially horizontal reciprocating plunger mounted in said frame for reciprocation substantially parallel to, above, and in a vertical plane between the vertical planes of said arms, means to reciprocate said plunger, an anvil, respective longitudinally extending rod elements rigidly secured to said anvil and slidably engaged with said frame on opposite sides thereof, a depending transverse flange on said anvil slidably engaging the top edges of said arms and arranged to guide the anvil for movement substantially in the axial direction of said plunger, a stem carried by said anvil and extending between the arms on the side of the anvil opposite said plunger, the free end of said plunger extending toward the anvil, a cam journalled between said arms adjacent said stem and substantially in the vertical longitudinal plane of said plunger and anvil, a peripheral flange on said cam, and a hook element on said stem engaging around said last-named flange.

EUGENE P. KENNEDY.

References Cited in the file of this patent

UNITED STATES PATENTS

| Number | Name | Date |
|---|---|---|
| 1,004,611 | White | Oct. 3, 1911 |
| 1,037,598 | Crawford | Sept. 3, 1912 |
| 1,185,377 | Coulson | May 30, 1916 |
| 1,485,570 | Schroeter | Mar. 4, 1924 |
| 2,307,656 | Abbott | Jan. 5, 1943 |

FOREIGN PATENTS

| Number | Country | Date |
|---|---|---|
| 658,134 | France | Jan. 22, 1929 |
| 678,234 | France | Dec. 23, 1929 |